(12) United States Patent
Anderson et al.

(10) Patent No.: US 7,666,495 B2
(45) Date of Patent: *Feb. 23, 2010

(54) UNCOATED FACESTOCK FOR ADHESIVE-BACKED LABELS

(75) Inventors: Dennis W Anderson, Goshen, OH (US); Kristine Butts, Collierville, TN (US)

(73) Assignee: International Paper Company, Memphis, TN (US)

( * ) Notice: Subject to any disclaimer, the term of this patent is extended or adjusted under 35 U.S.C. 154(b) by 579 days.

This patent is subject to a terminal disclaimer.

(21) Appl. No.: 11/113,802

(22) Filed: Apr. 25, 2005

(65) Prior Publication Data

US 2005/0252630 A1    Nov. 17, 2005

(51) Int. Cl.
*B32B 7/00* (2006.01)
*B41M 5/00* (2006.01)

(52) U.S. Cl. .................. 428/211.1; 428/212; 428/204; 428/352; 428/40.1; 428/41.8; 162/134; 162/135; 162/136; 162/123

(58) Field of Classification Search .......... 428/212, 428/195.1, 211.1, 204, 352, 40.1, 41.8; 162/134, 162/135, 136, 123
See application file for complete search history.

(56) References Cited

U.S. PATENT DOCUMENTS

| | | |
|---|---|---|
| 2,991,825 A | 7/1961 | Hampson |
| 4,287,021 A | 9/1981 | Justus et al. |
| 4,518,460 A | 5/1985 | Hauser et al. |
| RE31,923 E | 6/1985 | Justus et al. |
| 4,563,245 A | 1/1986 | Wanke et al. |
| 4,673,461 A | 6/1987 | Roerig et al. |
| 4,705,602 A | 11/1987 | Dahl |
| 4,749,445 A | 6/1988 | Vreeland |
| 4,880,501 A | 11/1989 | Schiel |
| 4,931,142 A | 6/1990 | Steiner et al. |
| 5,080,758 A | 1/1992 | Horng |
| 5,163,364 A | 11/1992 | Bubik et al. |
| 5,223,100 A | 6/1993 | Schiel et al. |
| 5,378,497 A | 1/1995 | Johnson et al. |
| 5,400,707 A | 3/1995 | Neider et al. |
| 5,483,873 A | 1/1996 | Koivukunnas et al. |
| 5,524,532 A | 6/1996 | Koivukunnas et al. |
| 5,614,064 A | 3/1997 | Nykopp |
| 5,681,618 A | 10/1997 | Damrau et al. |
| 5,694,837 A | 12/1997 | Neider et al. |
| 5,750,259 A | 5/1998 | Neider et al. |
| 5,753,084 A | 5/1998 | Bubik et al. |
| 5,755,931 A | 5/1998 | Schiel |
| 5,784,955 A | 7/1998 | Conrad |
| 5,816,146 A | 10/1998 | Wagner et al. |
| 5,836,242 A | 11/1998 | Aberg |
| 5,865,955 A | 2/1999 | Ilvespaa et al. |
| 5,894,679 A | 4/1999 | Kuhasalo et al. |
| 5,919,524 A | 7/1999 | Paloviita et al. |
| 5,976,635 A | 11/1999 | Kinnunen |
| 6,007,921 A | 12/1999 | Neider et al. |
| 6,190,500 B1 | 2/2001 | Mohan et al. |
| 6,203,307 B1 | 3/2001 | Neider et al. |
| 6,251,477 B1 | 6/2001 | Kinnunen et al. |
| 6,274,001 B1 | 8/2001 | Mohan |
| 6,287,424 B1 | 9/2001 | Mohan et al. |
| 6,293,037 B1 | 9/2001 | Spada et al. |
| 6,332,953 B1 | 12/2001 | Singh et al. |

FOREIGN PATENT DOCUMENTS

| | | |
|---|---|---|
| DE | 3632692 A1 | 10/1985 |
| EP | 0361402 A1 | 9/1989 |
| WO | WO 95/05853 | 3/1994 |
| WO | WO 94/28239 | 12/1994 |
| WO | WO 96/28609 | 9/1996 |

*Primary Examiner*—David R Sample
*Assistant Examiner*—Lawrence D Ferguson
(74) *Attorney, Agent, or Firm*—Thomas W. Barnes, III

(57) ABSTRACT

Disclosed is an uncoated facestock product having enhanced printability, holdout, and edge wick properties, which are attained through a combination of manufacturing techniques including increased refining of the furnish, sizing, increased hard nip calendering, and the use of extended nip calendering. The resulting uncoated facestock product has the following properties: a density between about 0.7 and 1.0 g/cc and/or an ash content of less than about 15% as measured by the 525° C. standard test method; and a finished surface having a Sheffield smoothness between about 50 and 150 Sheffield units and a Parker Print Surf roughness (PPS-10) less than about 5.0 microns.

20 Claims, 6 Drawing Sheets

UNCOATED FACESTOCK FOR ADHESIVE-BACKED LABELS

FIELD OF THE INVENTION

This invention relates generally to uncoated facestock for adhesive-backed labels and a method to manufacture the same. More particularly, this invention relates to a unique combination of refining, sizing, conventional hard-nip calendering, and extended nip calendering of uncoated paper to obtain a material that can replace coated one-side or coated two-side facestock ("coated facestock") presently used to make adhesive-backed paper labels.

BACKGROUND OF THE INVENTION

There is a need in the marketplace to replace coated facestock with uncoated facestock for use in adhesive-backed labels. A driving force behind this need is to cut the high cost associated with the purchase, application, and handling of the coatings that are used to coat such facestock materials.

Requirements that must be met by an uncoated facestock before it can be used to replace certain coated facestocks include obtaining a surface having good flexographic printing, adequate UV adhesive holdout, and minimum edge wick.

In order to attain the micro-smoothness required for good flexographic plate contact and ink transfer, conventional papermaking processes tend to compress the sheet, sacrificing bulk, stiffness and converting performance. Since facestock generally requires only one side to be finished (e.g. for subsequent printing and/or over-laminating), a process which could preferentially treat one surface would be desirable.

Temperature gradient calendering is a known process where the surface of the paper is heated to a temperature higher than the glass transition temperature of the cellulose in the nip while the bulk temperature of the sheet is substantially cooler. This process enables smoothness development with reduced bulk loss compared to conventional hard-nip (machine calendering) or hot-soft calendering. In addition, surface moisturization can also be used to lower the glass transition temperature preferentially closer to the surface to develop smoothness with minimum bulk loss.

Hot-soft calendering, another method of calendering that is commonly used for coated substrates, also relies on the temperature gradient calendering concept, but the web that is being pressed against a hot surface in a nip is supported by a roll that has a deformable cover. This cover gives the paper a longer dwell time in the nip compared to hard nip calendering and also allows the smoothness and gloss development to occur at relatively uniform density across the width of the paper. Soft calendering is an expensive option for existing machines and has limitations, such as cover delamination and cracking due to overheating.

Extended nip calendering extends the soft calendering concept to longer nip widths and reduces the operational problems. One type of extended nip calendering uses an endless band/belt over a backing roll to provide support for a paper web that is pressed against a heated cylinder. Another variation to this concept is to use a shoe instead of a roll as a backing for the paper web. The backing shoe provides longer nip widths, hence an increase in dwell time and a decrease in peak nip pressure. Use of extended nip calendering has provided substantial benefits for the manufacture of certain paper products such as envelope paper (reference U.S. Pat. No. 6,332,953).

Based on the high cost of coating conventional coated facestock, there is clearly a need in the market for uncoated facestock materials that have suitable or improved performance in comparison to conventional coated facestock.

SUMMARY OF THE INVENTION

This invention relates generally to the development of an uncoated facestock for adhesive-backed labels, and to a method for manufacturing the same, that may be used to replace coated facestock presently in use today. The invention results from discovering a unique combination of paper manufacturing techniques including refining, sizing, conventional hard-nip calendering, and extended nip calendering of uncoated facestock to obtain a material that can replace coated facestock presently used in adhesive-backed labels.

In particular, the present invention is an uncoated facestock material having the following properties: (1) a density between about 0.7 and 1.0 g/cc and/or an ash content of less than about 15% (measured in accordance with TAPPI Test Method T 211 om-93); and (2) a finished surface having a Sheffield smoothness between about 50 and 150 Sheffield units (measured in accordance with TAPPI Test Method T 538 om-88) and a Parker Print Surf roughness less than about 5.0 microns (measured in accordance with TAPPI Test Method T 555 om-94 using a pressure of 10 kgf/cm$^2$ with a soft backing (PPS-10)).

Additional properties of import include: (3) a 1% HST value greater than about 50 seconds (using a 1% formic acid solution and 80% reflectance); (4) a cross-machine direction tensile strength greater than about 15 lbf/inch; (5) a Gurley Stiffness of about 80 and 200 mgf as measured in the machine direction; and (6) a Gurley Stiffness of about 40 and 200 mgf as measured in the cross-machine direction (measured in accordance with TAPPI Test Method T 543 om-94.)

A customer may utilize the uncoated facestock product described above to make a label laminate that is useful as a name badge label, address label, shipping label, or the like. A process for making such labels is as follows: (1) apply a release material layer, such as silicone, on a surface of a release liner and allow the release material to dry; (2) apply an adhesive layer on the release material layer and allow the adhesive to dry; and (3) laminate the combined release liner, release material layer, and adhesive layer to the uncoated facestock so that the adhesive is in contact with the surface opposite the finished surface of the uncoated facestock product.

The customer (or a downstream customer of that customer) may utilize the product manufactured immediately above to make a dairy type label as follows: (1) print a pattern (e.g., corporate logo, product description, product contents) onto the finished surface of the uncoated facestock component of the label laminate; (2) apply a second adhesive layer to the finished surface of the uncoated facestock over the printed pattern; and (3) laminate a film such as polypropylene over the second adhesive layer. The resulting product may be used for dairy labels, soda container labels, and the like.

In accordance with a method of manufacturing uncoated facestock, after the paper is dried in a main drying section of the paper machine, the paper web is passed through a size press (e.g., puddle or metering including rod or blade) where the amount of pickup can be controlled. The size-press-treated paper is dried in the after section to a moisture level of about 4-6%. Following the size press treatment, the paper may be remoisturized using water showers (hydraulic, air atomized, ultrasonic) or steam showers on one or both sides of the paper. The amount of moisture addition will be between about 0.25-6% by weight.

Following the last dryer section, the web is calendered in one or more nips of a conventional hard-nip calender stack or a hot-soft calender, and finally by an extended nip calender. The extended nip calender includes a heated roll against which the surface that is being smoothed is pressed using a roll-backed or shoe-backed soft belt to support the web.

The extended-nip calender may be installed following the conventional calender stack/hot-soft calender, or it may be retrofitted from an existing machine calender. Retrofitting is an economical option compared to installing a new calender.

The heating in the belt calender rolls can be accomplished by any known processes, including internal induction, hot oil circulation, external induction, steam heating, direct heating, infrared heating and other such means. The heating process is designed to maintain the surface of the calendering rolls at a temperature of greater than about 121 deg. C. The nipload applied in the heated nips is preferably in the range from about 250 to 500 kN/m for a 70 mm shoe with a nip width of about 1 to 25 cm. The effective nip pressure can be reduced as the length of the shoe is increased. The preferred shoe length is about 30-100 mm.

Except for the use of an extended nip calender, uncoated facestock paper is generally made utilizing conventional paper making equipment. It is notable, however, that a unique combination of processes have been employed to obtain the characteristics described herein to successfully obtain satisfactory uncoated facestock that can replace coated one-side or coated two-side facestock in applications involving film over-lamination.

In brief, the combination of processes may include one or more of the following techniques: (1) increased refining of the uncoated facestock furnish; (2) increased sizing of the web in combination with the use of preferred sizing agents; (3) control of the temperature of the hard-nip calendering roller(s); (4) controlled application of steam or liquid water to the surface of the web just prior to calendering; (5) increased/additional hard-nip calendering; and (6) and extended nip calendering. The proper combination and implementation of these techniques all contribute to the ultimate success in making an uncoated facestock having improved flexographic print qualities, good holdout, and minimal edge wicking suitable for pressure-sensitive applications involving subsequent overlamination of the printed facestock with a protective film.

BRIEF DESCRIPTION OF THE DRAWINGS

So that those of ordinary skill in the art to which the subject invention pertains will more readily appreciate how to make and use the uncoated facestock disclosed herein, the paper product, its method of manufacture, and its use as a base product for manufacturing various types of labels is described in detail herein with reference to the following drawings, wherein.

DETAILED DESCRIPTION OF THE PREFERRED EMBODIMENTS

Figure 1:
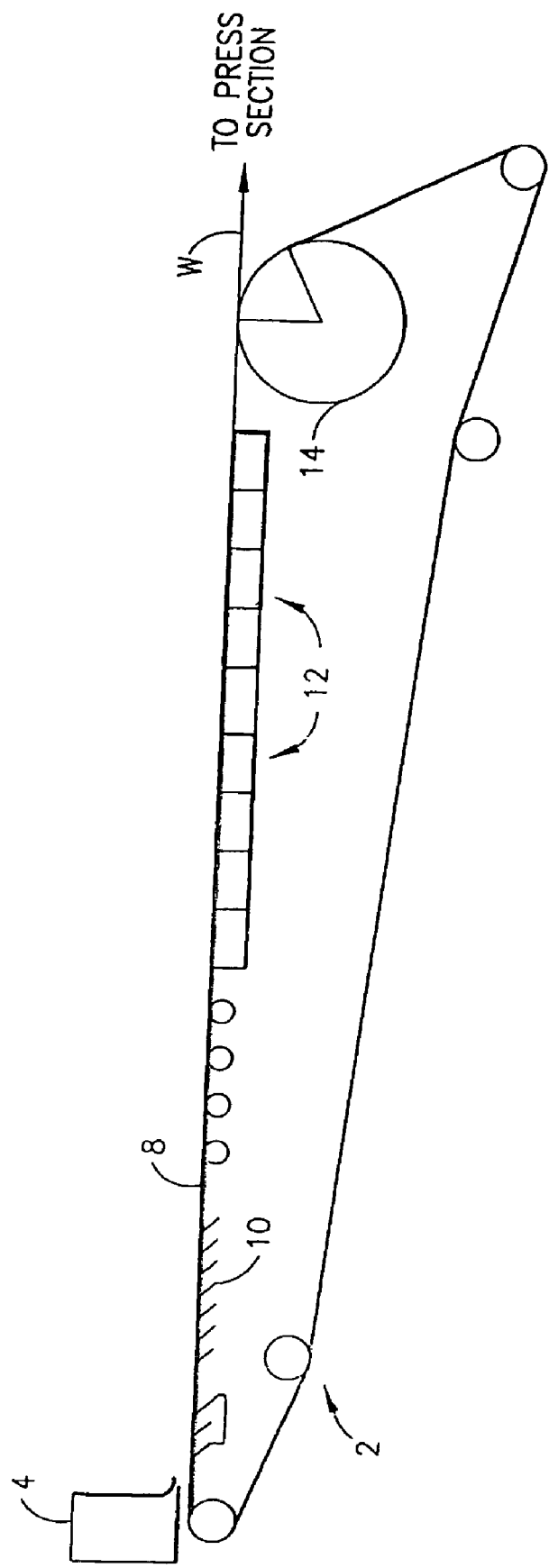
FIG. 1 is a diagrammatic view of a typical arrangement of a Fourdrinier machine suitable for use in manufacturing paper.

The present invention relates to a combination of steps including refining, sizing, conventional hard-nip calendering, and extended nip calendering to manufacture an uncoated facestock that replaces coated facestock presently used in adhesive-backed labels.

The teachings of U.S. Pat. Nos. 6,332,953, 6,287,424, 6,274,001, 6,190,500, 6,203,307, 6,007,921, 5,694,837, and 5,400,707 provide additional enabling disclosure for the present invention. The contents of these patents are incorporated by reference herein. Those of ordinary skill in the art of paper making will appreciate the relevant teachings found in these prior art references.

DEFINITIONS

As used herein, the term "dairy label" refers not only to labels used on cardboard, glass, and plastic milk containers, but also to labels used in similar applications. Such products may be manufactured by the following steps: (1) silicone coating a release liner; (2) applying pressure-sensitive adhesive to either the liner over the silicone coating or to the non-finished side of an uncoated facestock; (3) laminating the release liner and the uncoated facestock together; (4) flexography printing the finished side of the uncoated facestock; (5) applying an adhesive (typically UV-cured) on the printed side of the uncoated facestock; and (6) over-laminating a clear film onto the printed side of the uncoated facestock over the adhesive. The function of such a film is often to protect the facestock, for example, from water of condensation for refrigerated packaging. This process will be described with reference to FIG. 6 in greater detail herein below. Good holdout of the adhesive in step 5 is important to making a quality dairy label. To achieve adequate holdout and meet edge wick requirements, the facestock surface region must be sufficiently non-porous and the sheet must be sufficiently sized.

As used herein, the term "coated paper" refers to a paper product to which at least about 8 g/m$^2$ of coating color solids have been applied to at least one surface at a coating station. Examples of common coating stations include blade coaters, rod coaters, short dwell applicator coaters, gate roll coaters, film press coaters, fountain coaters, and the like. The mixture of coating color will generally consist of: (1) pigment(s) such as clay, calcium carbonate, titanium dioxide, and the like; (2) binder(s) such as modified starch, styrene butadiene rubber, polyvinyl acetate, vinyl acrylic, or polyvinyl alcohol; and (3) various functional additives such as dispersants, viscosity modifiers, cross-linking agents, lubricants, and the like. The resulting mixture is applied at a mixture solids content of about 40% or greater by weight, and means are provided for controlling the amount of dry coat weight applied. A size press operation applying a starch/pigment mixture to the sheet may or may not be used prior to the coating station.

As used herein, the term "uncoated paper" refers to any paper product which has 0.0 to about 8 g/m$^2$ of a starch or starch/pigment mixture of solids applied to one or both sides of the web, but which does not undergo subsequent surface application as described above. "Uncoated paper" thus may or may not undergo treatment at the size press. If a starch or starch pigment mixture is applied at the size press, the solids content of the mixture for "uncoated" paper will be less than about 40% by weight.

As used herein, the term "facestock" generally refers to the primary surface material that forms the actual label of a paper label. With respect to the presently disclosed invention, the term "uncoated facestock" paper means uncoated facestock paper having the following material properties: (1) a density between about 0.7 and 1.0 g/cc, and/or an ash content of less than about 15% as measured by the 525° C. standard test method, (2) a finished surface having a Sheffield smoothness between about 50 and 150 Sheffield units and a Parker Print Surf roughness (PPS-10) less than about 5.0 microns.

Additional properties may include: (3) a 1% HST (80% reflectance) value greater than about 50 seconds; (4) a cross-machine direction tensile strength greater than about 15 lbf/inch; (5) a machine direction Gurley stiffness of about 80 to 200 mgf; and (6) a cross-machine direction Gurley stiffness of about 40 to 200 mgf.

As used herein, the term "holdout" refers to the ability of a sheet of paper to resist penetration by flexographic inks and adhesive coatings applied to a printed or unprinted surface during manufacture of a film-overlaminated pressure-sensitive facestock.

As used herein, the term "hard nip calender" refers to two hard-surfaced rollers whose axes of rotation are parallel and whose roller surfaces are pressed against one another so that a nip is formed there between. Paper may be passed through the nip to improve the surface finish of the paper.

Referring to FIG. 1, facestock paper can be formed on a conventional Fourdrinier machine 2 fitted with a headbox 4. The furnish for the headbox 4 is provided by conventional means. Headbox 4 deposits the fibers on a forming table 8 of the Fourdrinier machine. At a suitable position along the forming table 8, vacuum is applied using conventional suction boxes 12. Water is removed by the foils 10 and by the suction roll 14. The web W exits the Fourdrinier machine and enters a conventional press section (not shown), which removes additional water by mechanical pressure. Additional process equipment may be used in conjunction with the Fourdrinier. For example, a top-former dewatering unit or a Dandy roll may be used.

It is notable that the furnish used for manufacturing uncoated facestock should be refined to a greater extent then would normally be done with a similar furnish that is to be used for more conventional uncoated paper products. Such additional refining will assist with closing up the sheet (which improves holdout) and will also enhance smoothness (which improves flexographic print quality). Standard mechanical refining means, such as disk or conical refiners, are satisfactory for this purpose. Those skilled in the art will appreciate that the degree to which the furnish should be refined will greatly depend on the quality of the refining equipment and paper making equipment, the furnish (e.g., refining response for northern species is different than that for southern species), and the final specifications of the uncoated facestock.

Figure 2:
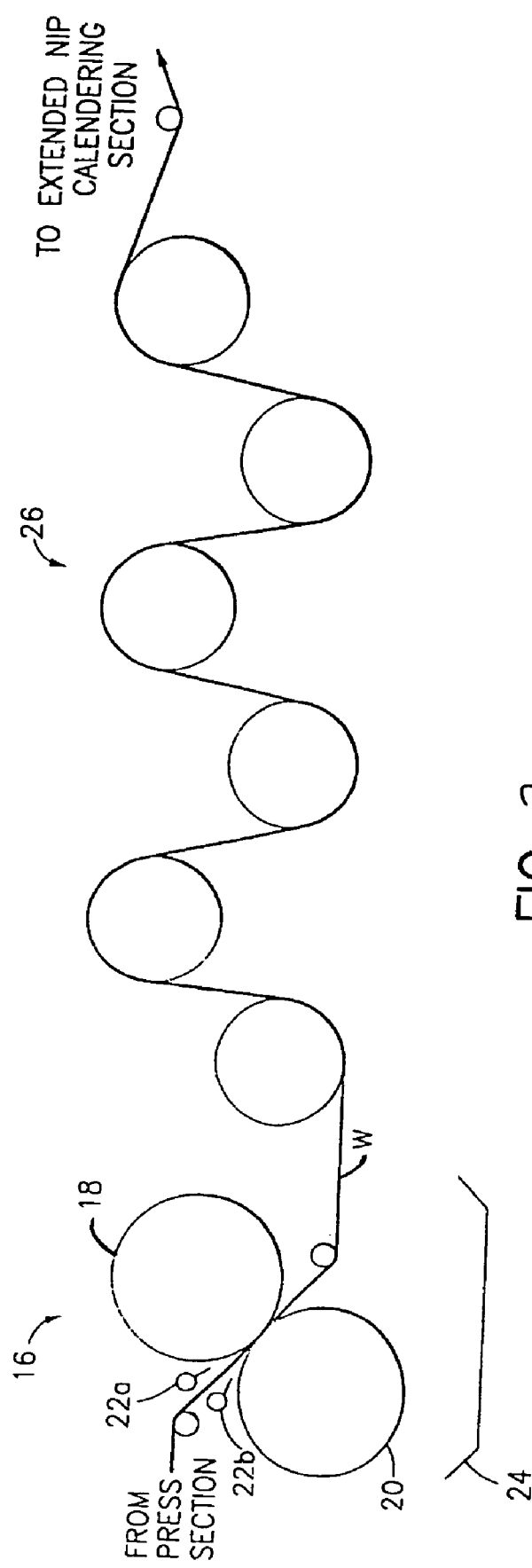
FIG. 2 is a diagrammatic view of a representative size press and aftersize dryer section which can be used in manufacturing paper.

Following the pressing in the press section, the paper web is dried in the main dryer section (not shown) of the paper machine. Referring to FIG. 2, the dried web is then optionally surface sized at a size press 16 (e.g., of the puddle or metering type) where the amount of pickup can be controlled. Sizing operations are carried out primarily to provide paper with surface strength and control of penetration by aqueous solutions. The treatment also improves the surface characteristics and certain physical properties of the paper such as stiffness. During surface sizing, surface voids in the sheet may be filled with pigment and starch or other binder particles.

FIG. 2 shows a size press station 16 having an inclined configuration. However, it will be appreciated by persons skilled in the art that the use of an inclined configuration is not necessary. In the alternative, the size press may be horizontal or vertical or have metering elements such as a rod or blade. In the inclined size press shown in FIG. 2, the web W passes through the nip between a pair of opposing size press rolls 18 and 20 at an angle of inclination between 0 to 90 deg., e.g., 45 deg. The nip formed by rolls 18 and 20 is flooded with sizing solution supplied on both sides of the web by respective banks of solution supply tubes 22a and 22b spaced in the cross machine direction. The web W absorbs some of the solution and the unabsorbed solution is removed by the pressure in the nip. The overflow solution is collected in a pan 24 arranged directly below the press rolls and is recirculated back to the nip through the solution supply tubes.

The size press 16 can be used to add a variety of agents for a variety of purposes (e.g., starch and polyvinyl alcohol for strength, pigments such as calcium carbonate and clay for improving the brightness, opacity, and smoothness of the product). The starch solution (e.g., unmodified, acid modified, preoxidized or hydroxyethylated) may have a starch solids concentration in the range of about 1 to 25%. In addition, the size press solution may optionally contain a lubricant that is compatible with the starch and other binders. This lubricant can belong to a class of polyethylene emulsions or can be a polyglyceride. Optical brighteners may also be added at the size press. The size press-treated paper is dried in a dryer station 26 to a moisture level of about 2 to 6%.

It has been found that higher levels of sizing, as measured by the Hercules Size Test (HST) test (using a 1% formic acid and an 80% reflection endpoint), benefits holdout of both ink and adhesive. Sizing using about 5 to 18 lb/ton Cypress® 225 styrene acrylic acid sizing agent (Cytec Technology Corp., DE, USA) at the size press has proven successful. Sizing agents other than Cypress® 225 have worked as well as long as sufficient sizing levels (as measured by HST) were achieved. For example, about 5 to 15 lb/ton of Baysize® styrene acrelate emulsion (Bayer Aktiengesellschaft, Germany) has worked well.

Figure 3:
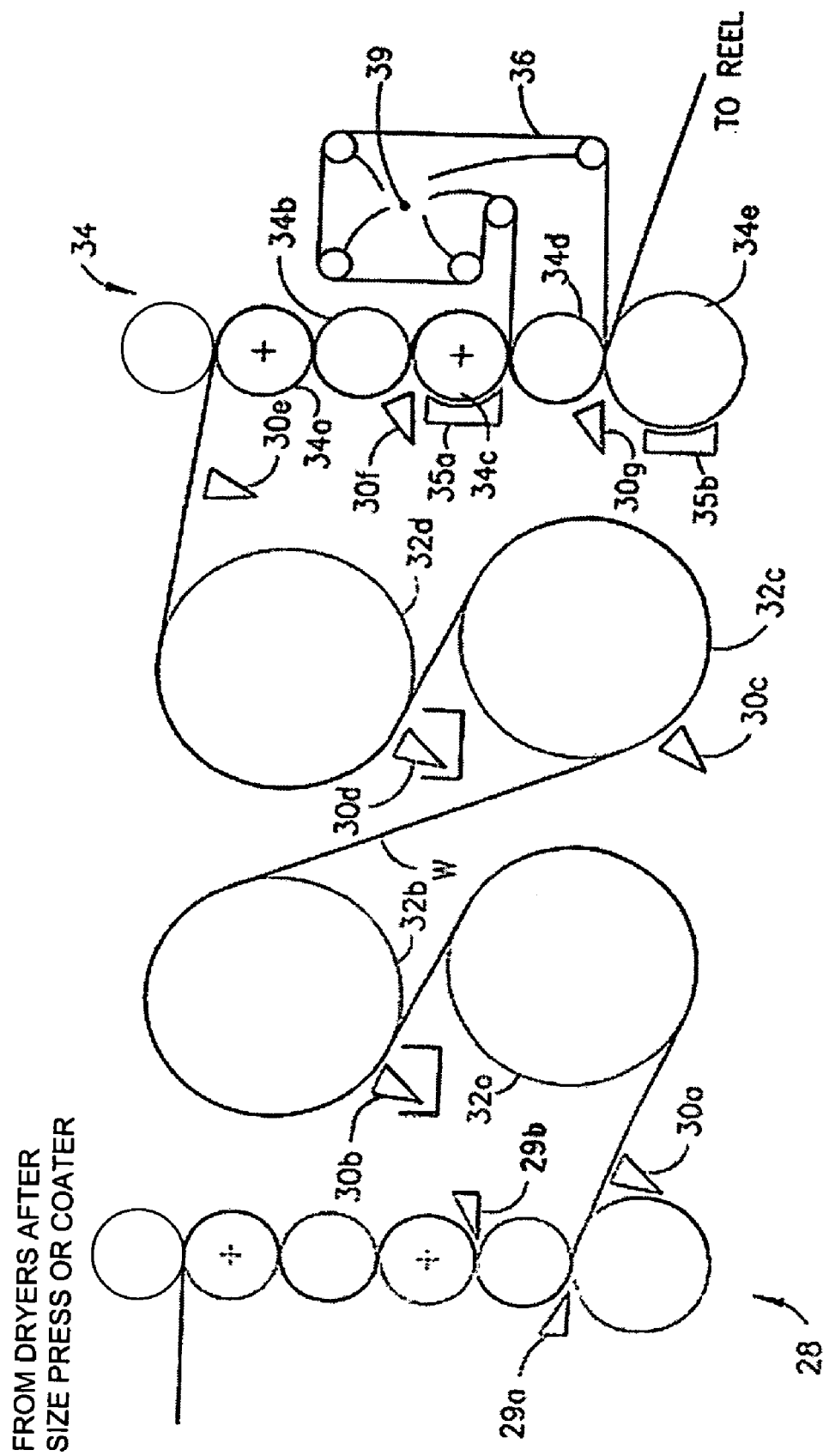
FIG. 3 is a diagrammatic view of a known calendering section of a paper machine which has been retrofitted to an extended nip calendering arrangement for use in finishing facestock paper in accordance with an embodiment of the invention.

Following the size press station 16 and dryer station 26, the paper web W is passed through a first multi-roll calender stack 28 as shown in FIG. 3. The calender stack 28 may be equipped with one or more conventional waterboxes 29. FIG. 3 shows a wet stack 28 having two conventional waterboxes 29a and 29b which conventionally apply water or aqueous solutions to respective sides of the paper. As described in greater detail herein below, because the machine calendering line shown in FIG. 3 is retrofitted with moisturizing showers 30, the waterboxes 29a and 29b are not used to apply moisture to the paper, i.e., the waterboxes are either removed or left in place but not activated to apply liquid to the paper web. Multi-roll calender stack 28 is shown to include six rollers; however, the stack may include as few as two rollers. The number of rollers required will depend on, for example, how much calendering is needed, whether moisture is to be added to the paper, whether moisture is to be added to one or both sides of the paper.

After the paper web W has passed through the stack 28, the web may be moisturized on one or both sides using one or more moisturizing showers 30. The moisturizing showers may consist of water showers (e.g., hydraulic, air atomized or ultrasonic showers), steam showers, or a combination of water showers and steam showers. In an embodiment of the present invention, steam showers are used to apply steam to the web surface in an amount of about 0.5 to 6 $g/m^2$.

Calender stack 34 comprises calender rolls 34a-34e, at least one of which may be heated. In accordance with an embodiment of the invention, a soft, i.e., conformable, endless belt 36 is installed such that the belt is partially wrapped around calender roll 34d, which is unheated, to form a first extended nip with calender roll 34c, which is heated, e.g., by an external induction heater 35a. The belt 36 presses the web against the surface of heated calender roll 34c and is supported by a plurality of guide rolls 39 and by calender roll 34d. Although FIG. 3 shows belt calendering of the wire side of the web, alternative arrangements can be used to calender the felt side instead. For example, the felt side can be calendered by wrapping the belt around calender roll 34c and then heating calender roll 34b instead of calender roll 34c.

In accordance with the embodiment shown in FIG. 3, the calendered side of the web W can be moisturized using a moisturizing shower 30f, e.g., steam shower. In addition to moisturization, the steam shower will also raise the temperature of the surface of the calendered side of the web. The moisturized side of web W is then smoothed as it passes through the hot extended nip formed by heated calender roll 34c and conformable belt 36. The steam shower 30f is located very close to the first extended nip between rolls 34b and 34c so that the time interval between steam application and hot extended nip calendering is minimized. Minimizing this time will preserve a gradient in moisture across the thickness of the web.

In cases where more than one moisturizing shower is used to apply moisture to the same side, the last shower that applies moisture should be located as close to the extended nip as possible. The dwell time between moisturization using the steam shower 30f and calendering in the first hot extended nip should be about 0.01 to 6.0 sec. The nipload in the heated nip between rolls 34c and 34d is preferably in the range from 250 to 500 kN/m (for a nip width in the range of 1 to 25 cm).

Preferably, calender roll 34b is adjusted against calender roll 34c so that the finished side of the web will be hard nip calendered before entering the first extended nip calender. Greater use of machine calendering prior to extended nip calendering has shown reduced permeability in the uncoated facestock and improved adhesive holdout prior to over-laminating with polypropylene films. In addition, it has been found that additional calendering also decreases stiffness, and improves Sheffield smoothness, and reduces Parker Print Surf roughness.

It is notable that in contrast to the manufacture of envelope paper products that preferably minimizes bulk reduction (ref. U.S. Pat. No. 6,332,953, col. 1, lns. 10-14, and col. 2, lns. 59-65), the minimization of bulk reduction is not particularly critical in the manufacture of uncoated facestock. Therefore, machine calendering may be more readily utilized to fine-tune the surface finish of uncoated facestock as described above.

As depicted in FIG. 3, optionally calender roll 34e may also be heated, e.g., by external induction heater 35b, to provide a second hot extended nip for further smoothing of the calendered side of the web W. In such case, the web can be remoisturized by moisturizing shower 30g before the web enters the second extended nip formed by heated calender roll 34e and conformable belt 36.

In accordance with an embodiment of the invention, calender rolls 34c and 34e may be heated by conventional external induction heater 35a and 35b, respectively. However, it will be appreciated by persons skilled in the art that other conventional means could be used to heat calender rolls 34c and 34e. For example, the hot pressure nips can be created by heating one or more of the rolls in stack 34 using internal steam, circulating oil or other heating fluid, internal or external induction coils, direct heating or infrared heating. The heat input into the rolls is preferably sufficient to maintain a roll surface temperature of greater than about 121 deg. C. (250 deg. F.) during calendering of the web.

Although the calendering line shown in FIG. 3 comprises two calender stacks 28 and 34 separated by intercalender dryers 32a-32d, it should be appreciated that to finish the uncoated facestock paper requires, at a minimum, only a single calender stack including, for example, one nip of a hard nip calender. Subsequent calendering using an extended nip calender is preferred but not always necessary.

When intercalender dryers are present, they are normally used to dry the sheet to lower the moisture that the web picks up in the wet stack. This drying is not needed because, as noted above, the waterboxes on the wet stack are not used. Therefore, the intercalender dryers can be used to cool the sheet by running cold water or other cooling fluid through them. Alternatively, the web may be routed around any of the existing intercalender dryers simply to extend the convective cooling during web travel. In such case, the dryers need not be filled with a cooling medium.

In a dry stack 34 retrofitted with an endless conformable belt 36, the belt 36 is formed using a fabric base and coated using a polymeric material such as a polyurethane. The belt 36 is pre-formed in that it is supplied as a continuous loop. The finished belt 36 may have a hardness from 58 Shore A to 88 Shore C and a thickness of 5-25 mm, and is finished to a surface roughness of no greater than 8 µm RMS.

In addition, the uniformity of the belt 36 will be such that the thickness variation across the width of the paper machine will be no greater than 0.02 mm. The loop length of belt 36 will be optimized to be located in the available space in the dry stack and also have sufficient cooling outside the nip. Installation of the endless belt 36 on the calender stack may be an involved procedure. As an alternative to using an endless belt, the belt can be seamed in place and the seam covered with a material that minimizes marking due to the seam in the calendering operation.

To practice the invention it is possible to retrofit a conventional machine calendering section by installing a conformable belt. In addition, the conventional machine calendering section may be retrofitted with moisturizing showers and external induction heaters, as shown in FIG. 3.

Figure 4:
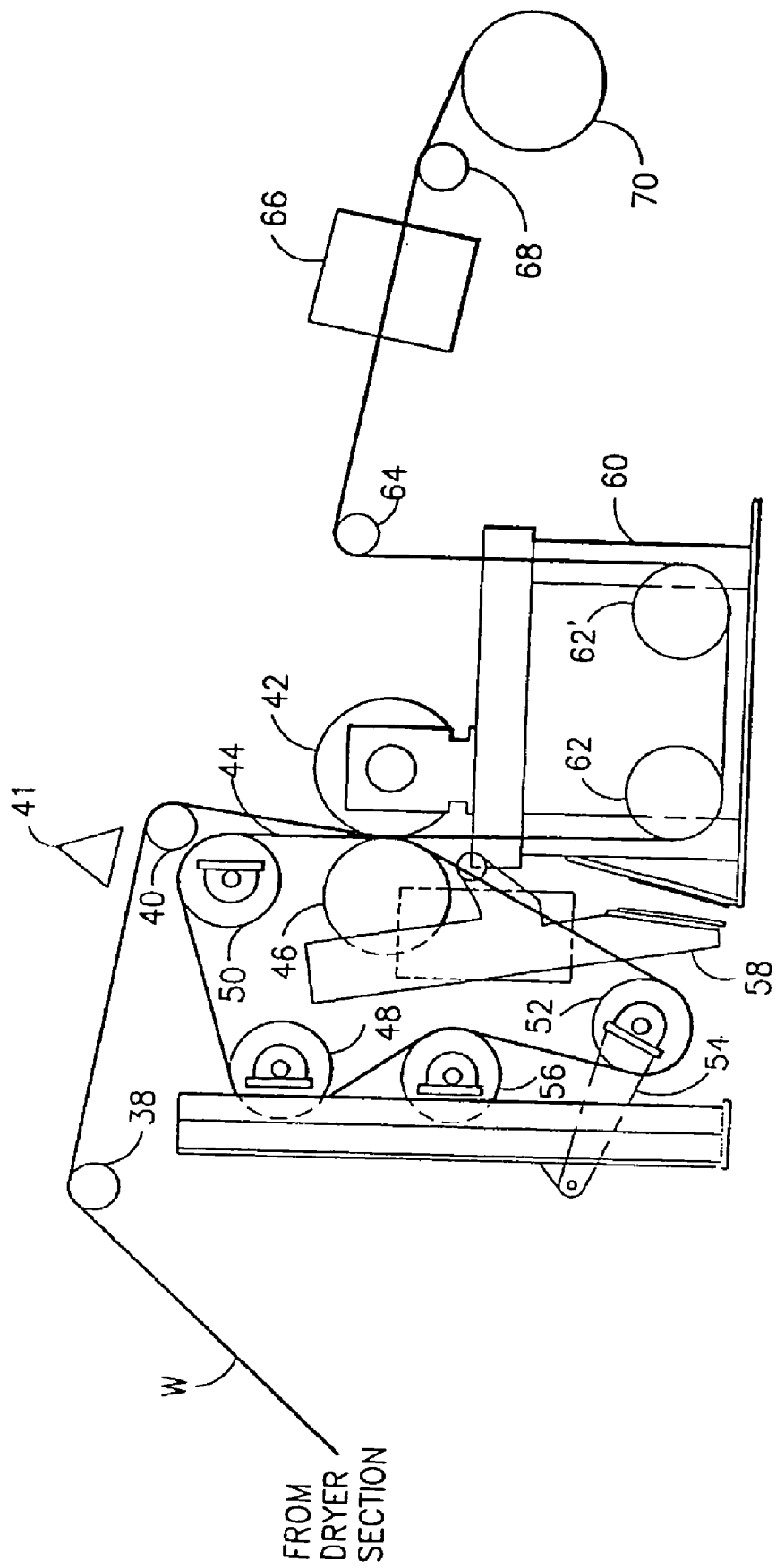
FIG. 4 is a diagrammatic view of an alternative extended nip calendering arrangement which can be used to finish facestock paper in accordance with an embodiment of the invention.

In accordance with a further alternative, the uncoated facestock may be manufactured by installing a belt calendering arrangement of the type shown in FIG. 4 in place of the dry stack. The belt properties used in a new calender installed in place of an existing dry stack will be similar to the properties described for the retrofitted calenders. Cooling devices other than intercalender dryers, such as cooling cylinders, chill boxes, chill rolls and air showers, can be used to cool the side of the paper which is not contacted by the heated calender roll of the belt calendering arrangement. Use of such cooling devices is optional.

Referring to FIG. 4, the tension in the web W can be adjusted by changing the position of a tensioning roll 38 utilizing any conventional tensioning device (not shown). The web is wrapped partly around a guide roll 40 and passes through an extended nip formed by a heated calender roll 42 and a conformable belt 44 made of resilient material.

The position of guide roll 40 is adjustable to increase the angle of contact of the web W with the heated calender roll 42 upstream of the extended nip, which angle of contact determines the amount of preheating applied to the web by the heated calender roll 42. Before entering the nip, the web W is optionally moisturized by a bank of moisturizing showers 41 of the type previously described. The web W is pressed against the heated calender roll 42 by a backing roll 46 that exerts a load on the belt 44.

Belt 44, which may be either endless or seamed, circulates on carrier rolls 48 and 50 and tensioning roll 52. The tensioning roll 52 is rotatably mounted on the end of a pivotable arm 54. A guide roll 56 is located outside and in contact with belt 44. The backing roll 46 is rotatably mounted on a loading arm 58, which is in turn pivotably mounted on a support frame 60. The loading arm 58 has a first angular position (shown in FIG. 4) in which the backing roll 46 presses the belt 44 against the heated calender roll 42, and a second angular position (not shown in FIG. 4) in which the belt 44 is relaxed and separated from the heated calender roll 42 by a gap.

The surface of the heated calender roll 42, when pressed against the side of the web W that will be printed, applies heat. The residence time of the web in the extended nip is sufficiently short so that the heat does not penetrate through the entire thickness of the web. The applied heat raises the surface temperature of the paper to the glass transition temperature or higher, which causes the fibers to soften and conform under pressure to the surface of the heated calender roll 42. This allows the treated surface of the web to achieve desired smoothness and desired printing performance at an improved level of adhesive holdout for subsequent film overlaminating.

The calendered web passes under guide rolls 62 and 62' and then over guide roll 64. A scanning sensor unit 66 measures the moisture level and basis weight of the web. The web then passes over guide roll 68 and winds onto winding roll 70 in preparation for further processing, storage, or shipment to a customer.

Figure 5:
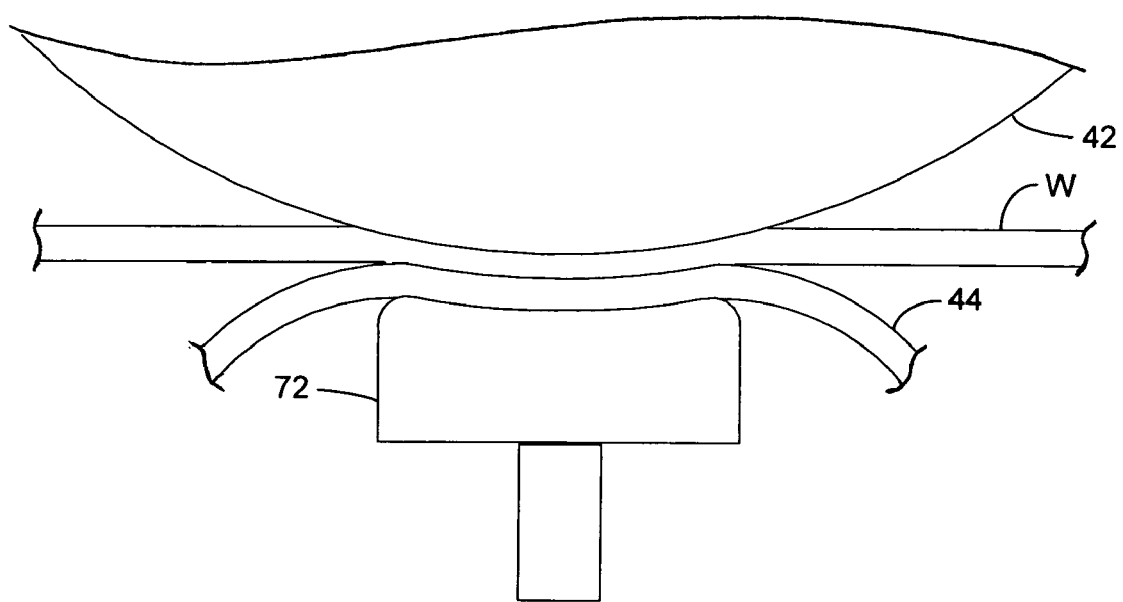
FIG. 5 is a diagrammatic view of an extended nip calendering arrangement in which a conformable belt is supported against a heated calender roll by means of a backing shoe arrangement for use in finishing facestock paper in accordance with an embodiment of the invention.

In accordance with another embodiment of the present invention, the backing cylinder roll 46 can be replaced by a backing shoe to provide an even greater nip width. An example of such an extended nip calendering arrangement is depicted in FIG. 5. This shoe nip calendering arrangement comprises a heated calender roll 42, a conformable belt 44 made of resilient material, and a backing shoe 72. The backing shoe 72 is urged toward the heated calender roll 42 by means of loading elements (not shown). During belt operation, the belt 44 glides over the contoured surface of the backing shoe. To reduce friction during gliding, lubricating oil is supplied between the bottom surface of the belt 44 and the curved surface of the backing shoe 72 by an oil lubrication system (not shown). The nip width is determined by the width of the backing shoe, the radius of the heated calender roll, and the thickness of the belt. A desirable nip width is between about 1 and 25 cm.

Utilizing the apparatus shown in FIG. 3, 4, or 5 with a hot calender roll surface temperature greater than about 121 deg. C. (250 deg. F.), a calender nipload that varies between about 250 to 500 kN/m and having a nip width between about 1 and 25 cm, sample uncoated facestock paper acquired the following density and surface finish characteristics: (1) a density between about 0.7 and 1.0 g/cc and/or an ash content of less than about 15% (measured by the 525° C. standard test method); and (2) a finished surface having a Sheffield smoothness between about 50 and 150 Sheffield units (measured in accordance with TAPPI Test Method T 538 om-88) and a Parker Print Surf roughness less than about 5.0 microns (measured in accordance with TAPPI Test Method T 555 om-94 using a pressure of 10 kgf/cm$^2$ and a soft backing (PPS-10).) Additional refining of the furnish, increased sizing, and/or the application of additional mechanical calendering, as described herein above, may also contribute to these characteristics depending on, for example, the paper making equipment that is used.

Figure 6:
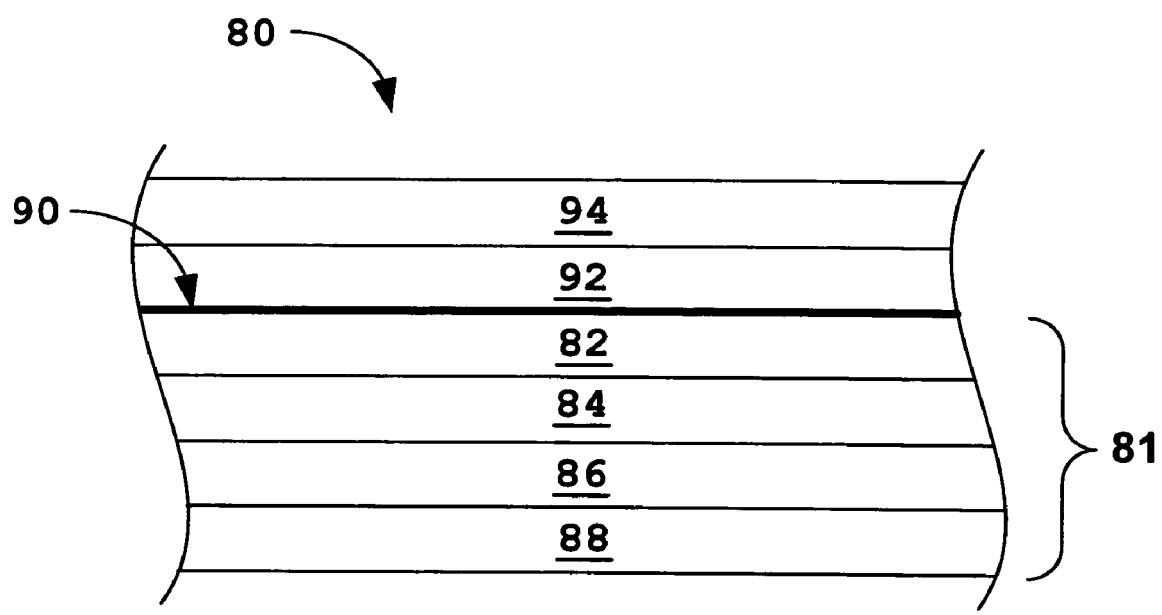
FIG. 6 is a side view of a film-laminated pressure-sensitive label product that incorporates uncoated facestock paper made by utilizing the unique combination of manufacturing techniques disclosed herein.

Referring to FIG. 6, a side view of a laminated adhesive-backed label product 80 utilizing the uncoated facestock paper product 82 manufactured by the method described herein above is illustrated. The label product 80 consists of two portions: a lower label portion 81 that is useful in certain labeling applications (described below); and the entire adhesive-backed label product 80 that is useful in certain other applications (described below).

A customer may utilize the uncoated facestock paper product 82 to make the lower layer portion 81 as follows: (1) apply a coating of release material 86, such as silicone, to a surface of a release liner 88 and allow the release material 86 to dry; (2) apply a coating of adhesive 84 over the release material 86 and allow the adhesive 84 to dry; and (3) laminate the release liner 88 to the uncoated facestock 82 so that the adhesive 84 is in contact with the surface opposite the finished surface 90 of the uncoated facestock 82. Depending on the type of facestock 82, adhesive layer 84, release material 86, and release liner 88 that are utilized, the resulting product may be used for name badge labels, address labels, shipping labels, desk-top publishing labels, or the like.

The customer (or a customer downstream to that customer) may utilize the adhesive-backed label described as label 81 to make a waterproof label as follows: (1) print a pattern (e.g., corporate logo, product description, product contents) onto the finished surface 90 of the uncoated paper facestock 82; (2) apply a second adhesive layer 92 to the finished surface 90 of the uncoated paper facestock 82 (over the printed pattern); and (3) laminate a protective waterproof film 94 to the second adhesive layer 92. Depending on the type of facestock 82, adhesive layer 84, release material 86, release liner 88, second adhesive layer 92, and film layer 94 that are utilized, the resulting product may be used for dairy labels, soda container labels, frozen food labels, and the like.

When an uncoated paper product is coated, the resulting ash content will be driven up considerably. Therefore, a measurement of this parameter is useful in determining if a facestock material is in fact either coated or uncoated. An acceptable cutoff percentage for making this determination has been established at 15% as measured by the 525 deg. C. test method (TAPPI Test Method T 211 om-93).

The shoe nip calendering method significantly improves the microscale smoothness over the macroscale smoothness. That is, where the two parameters are normally consider by those of ordinary skill in the art to be coupled, they actually become decoupled due to the use of shoe nip calendering.

Here the term microscale is being used to refer to a scale where roughness can be characterized by the aforementioned test for Parker Print Surf roughness while macroscale refers to a length scale where smoothness can be characterized using the aforementioned test for Sheffield smoothness. Considering the results of flexographic printing tests, where print quality was based on an absence of print voids, it has become apparent that printing quality is more dependent on Parker Print Surf roughness then on Sheffield smoothness.

The table below lists example trial test data for an uncoated facestock paper product made in accordance with an embodiment of the present invention.

EXAMPLE TEST DATA

| Property | Units | Sample "A" | Sample "B" |
|---|---|---|---|
| Basis Weight | lb/3,000 sq. ft. | 45.9 | 45.9 |
| Caliper | 0.001 inch | 3.56 | 3.59 |
| Density | gram/cc | 0.83 | 0.82 |
| Print Side Smoothness | Sheffield Units | 75 | 75 |
| Print Side PPS-10 | Microns | 3.7 | 3.9 |
| HST (1%) | Seconds | 290 | 230 |
| CD Tensile | lbf/inch | 21 | 20 |
| MD Stiffness | mgf | | 142 |
| CD Stiffness | " | | 79 |

Earlier efforts to create uncoated facestock paper for use in, e.g., dairy labels, have not been successful as evidenced in the results in those efforts bearing products with poor flexographic printing properties, inadequate UV adhesive holdout, and excessive edge wick. Those of ordinary skill in the art should appreciate that the innovative uncoated facestock paper product disclosed herein overcomes these problems resulting in more economical paper facestock products since the facestock no longer requires to be coated in the conventional manner to acquire those properties. Examples of such conventional coating processes are disclosed in U.S. Pat. Nos. 5,919,524, 5,976,635, 5,681,618, and 6,251,477, the contents of which are incorporated by reference herein.

Those of ordinary skill in the art further will appreciated that the exact combination of parameters necessary to produce the uncoated facestock product as disclosed herein is difficult at best to provide since there are many variables between different paper making equipment (e.g., equipment type and quality), raw materials, etc. Indeed, the same paper making machine will perform slightly differently from day to day due to atmospheric conditions, equipment operating conditions, etc., requiring periodic equipment adjustments to ensure that all facestock products meet their specifications. Therefore, such an exact recipe cannot be provided. However, the inventors have provided herein the best mode known to them and believe the invention is fully enabled so that one that of ordinary skill in the art of paper making could, without unreasonable experimentation, produce the product and perform the method found in the claims appended hereto.

While the invention has been described with reference to preferred embodiments, it will be understood by those of ordinary skill in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to any particular embodiment disclosed as the best mode contemplated for carrying out this invention, but that the invention will include all embodiments falling within the scope of the appended claims.

What is claimed is:

1. A paper product, comprising
    an uncoated paper facestock having a density between about 0.7 and 1.0 g/cc and a finished surface having a Sheffield smoothness between about 50 and 150 Sheffield units and a Parker Print Surf roughness (PPS-10) less than about 5.0 microns; and
    at least one adhesive layer.

2. A method of making the paper product according to claim 1, comprising contacting the at least one adhesive layer with a surface opposite said finished surface of said uncoated paper facestock.

3. A method of making the paper product according to claim 1, comprising contacting the at least one adhesive layer with the finished surface of said uncoated paper facestock.

4. The paper product according to claim 1, wherein the uncoated paper facestock further comprises an ash content of less than about 15% as measured by the 525° C. standard test method.

5. The paper product according to claim 1, wherein the uncoated paper facestock further includes a 1% HST (80% reflectance) value greater than about 50 seconds.

6. The paper product according to claim 1, wherein the uncoated paper facestock further includes a cross-machine direction tensile strength greater than about 15 lbf/inch.

7. The paper product according to claim 1, wherein the uncoated paper facestock further includes a Gurley Stiffness selected from a group including a stiffness of about 80 and 200 mgf as measured in the machine direction, and a stiffness of about 40 and 200 mgf as measured in the cross-machine direction.

8. A paper product, comprising
    an uncoated paper facestock having a density between about 0.7 and 1.0 g/cc and a finished surface having a Sheffield smoothness between about 50 and 150 Sheffield units and a Parker Print Surf roughness (PPS-10) less than about 5.0 microns; and
    a printed pattern.

9. The paper product according to claim 8, wherein the printed pattern is printed onto the finished surface of the uncoated paper facestock.

10. A method of making the paper product according to claim 8, comprising printing a pattern on the finished surface of the uncoated paper facestock.

11. The paper product according to claim 8, wherein the uncoated paper facestock further comprises an ash content of less than about 15% as measured by the 525° C. standard test method.

12. The paper product according to claim 8, wherein the uncoated paper facestock further includes a 1% HST (80% reflectance) value greater than about 50 seconds.

13. The paper product according to claim 8, wherein the uncoated paper facestock further includes a cross-machine direction tensile strength greater than about 15 lbf/inch.

14. The paper product according to claim 8, wherein the uncoated paper facestock further includes a Gurley Stiffness selected from a group including a stiffness of about 80 and 200 mgf as measured in the machine direction, and a stiffness of about 40 and 200 mgf as measured in the cross-machine direction.

15. A paper product, comprising
    an uncoated paper facestock having a density between about 0.7 and 1.0 g/cc and a finished surface having a Sheffield smoothness between about 50 and 150 Sheffield units and a Parker Print Surf roughness (PPS-10) less than about 5.0 microns; and
    at least one film layer.

16. The paper product according to claim 15, wherein the at least one film layer comprises polypropylene.

17. The paper product according to claim 15, wherein the uncoated paper facestock further comprises an ash content of less than about 15% as measured by the 525° C. standard test method.

18. The paper product according to claim 15, wherein the uncoated paper facestock further includes a 1% HST (80% reflectance) value greater than about 50 seconds.

19. The paper product according to claim 15, wherein the uncoated paper facestock further includes a cross-machine direction tensile strength greater than about 15 lbf/inch.

20. The paper product according to claim 15, wherein the uncoated paper facestock further includes a Gurley Stiffness selected from a group including a stiffness of about 80 and 200 mgf as measured in the machine direction, and a stiffness of about 40 and 200 mgf as measured in the cross-machine direction.

* * * * *